United States Patent
Takeshita et al.

(10) Patent No.: US 6,839,899 B2
(45) Date of Patent: Jan. 4, 2005

(54) OPTICAL ELEMENT DRIVING DEVICE HAVING TWO PERMANENT MAGNETS AND ONE MAGNETIC SUBSTANCE

(75) Inventors: Nobuo Takeshita, Tokyo (JP); Mitoru Yabe, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 158 days.

(21) Appl. No.: 10/265,251

(22) Filed: Oct. 7, 2002

(65) Prior Publication Data

US 2003/0179686 A1 Sep. 25, 2003

(30) Foreign Application Priority Data

Mar. 22, 2002 (JP) ........................................ 2002-080669

(51) Int. Cl.[7] .................................................. G11B 7/09
(52) U.S. Cl. ..................................... 720/681; 369/44.22
(58) Field of Search ................................ 720/659, 662, 720/672, 681; 369/44.14, 44.17, 44.21, 44.22, 244; 359/814, 823, 824

(56) References Cited

U.S. PATENT DOCUMENTS

| | | | |
|---|---|---|---|
| 4,664,476 A | | 5/1987 | Kasuga |
| 4,790,628 A | * | 12/1988 | Nanno et al. ............... 359/814 |
| RE33,548 E | | 3/1991 | Kime |
| 5,191,484 A | * | 3/1993 | Yeon et al. .................. 359/824 |
| 5,659,525 A | * | 8/1997 | Miyamae et al. ......... 369/44.22 |
| 5,870,371 A | * | 2/1999 | Tsuchiya et al. ........ 369/112.24 |
| 6,195,314 B1 | * | 2/2001 | Inui et al. ................. 369/44.14 |
| 6,288,853 B1 | * | 9/2001 | Kamada ..................... 359/823 |

FOREIGN PATENT DOCUMENTS

| | | | |
|---|---|---|---|
| JP | 2-42215 U | | 3/1990 |
| JP | A-7-110955 | | 4/1995 |
| JP | 9-54967 | * | 2/1997 |
| JP | 10-3674 A1 | | 1/1998 |
| JP | 10-64074 | * | 3/1998 |
| JP | 10-134381 | * | 5/1998 |
| JP | 10-283647 A1 | | 10/1998 |
| JP | 2001-34972 A1 | | 2/2001 |
| JP | 2001-67693 A1 | | 3/2001 |
| JP | 3088532 U | | 6/2002 |

* cited by examiner

*Primary Examiner*—David L. Ometz
(74) *Attorney, Agent, or Firm*—Birch, Stewart, Kolasch & Birch, LLP

(57) ABSTRACT

Tracking coils are fixed on side surfaces of a lens holder and a magnetic substance of axisymmetric shape is fixed on a lower surface of the lens holder, being sandwiched by a focusing coil. Moreover, end portions of the magnetic substance are opposed to respective N-pole surfaces of permanent magnets serving as a focusing driving device and a tracking driving device together with the above coils. As a result, a neutral position holding system for an objective lens can be formed of these permanent magnets and the magnetic substance.

7 Claims, 11 Drawing Sheets

F I G . 7
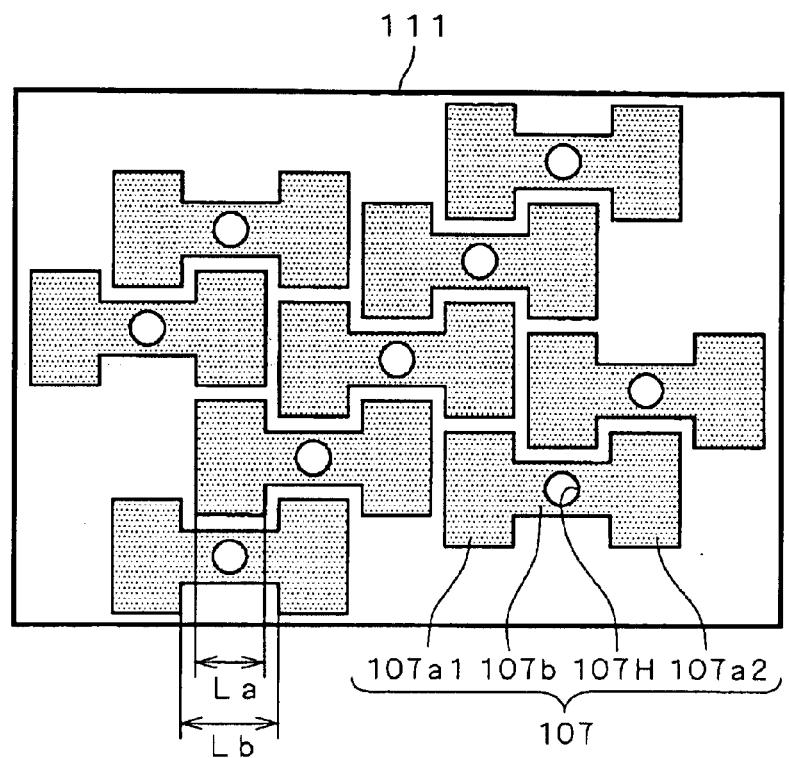
F I G . 8
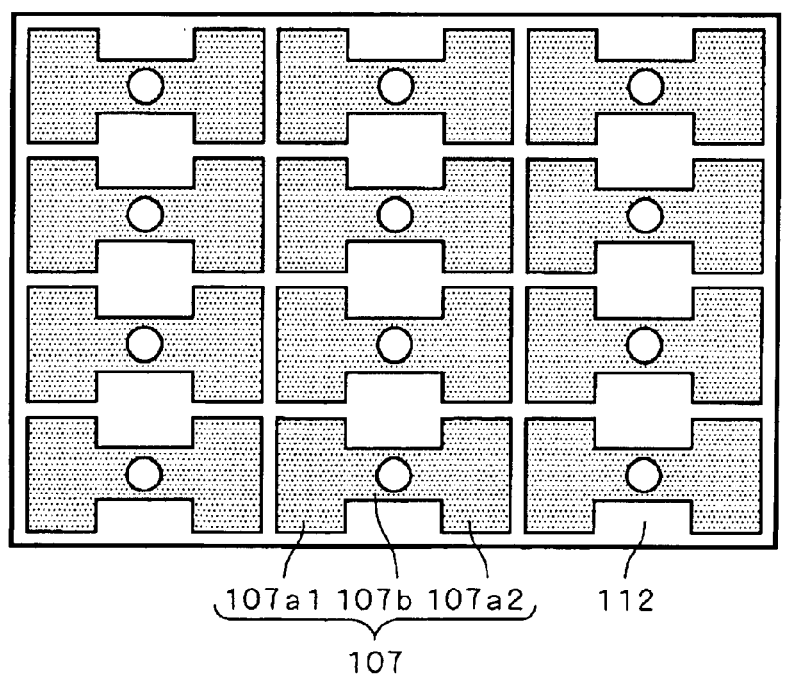

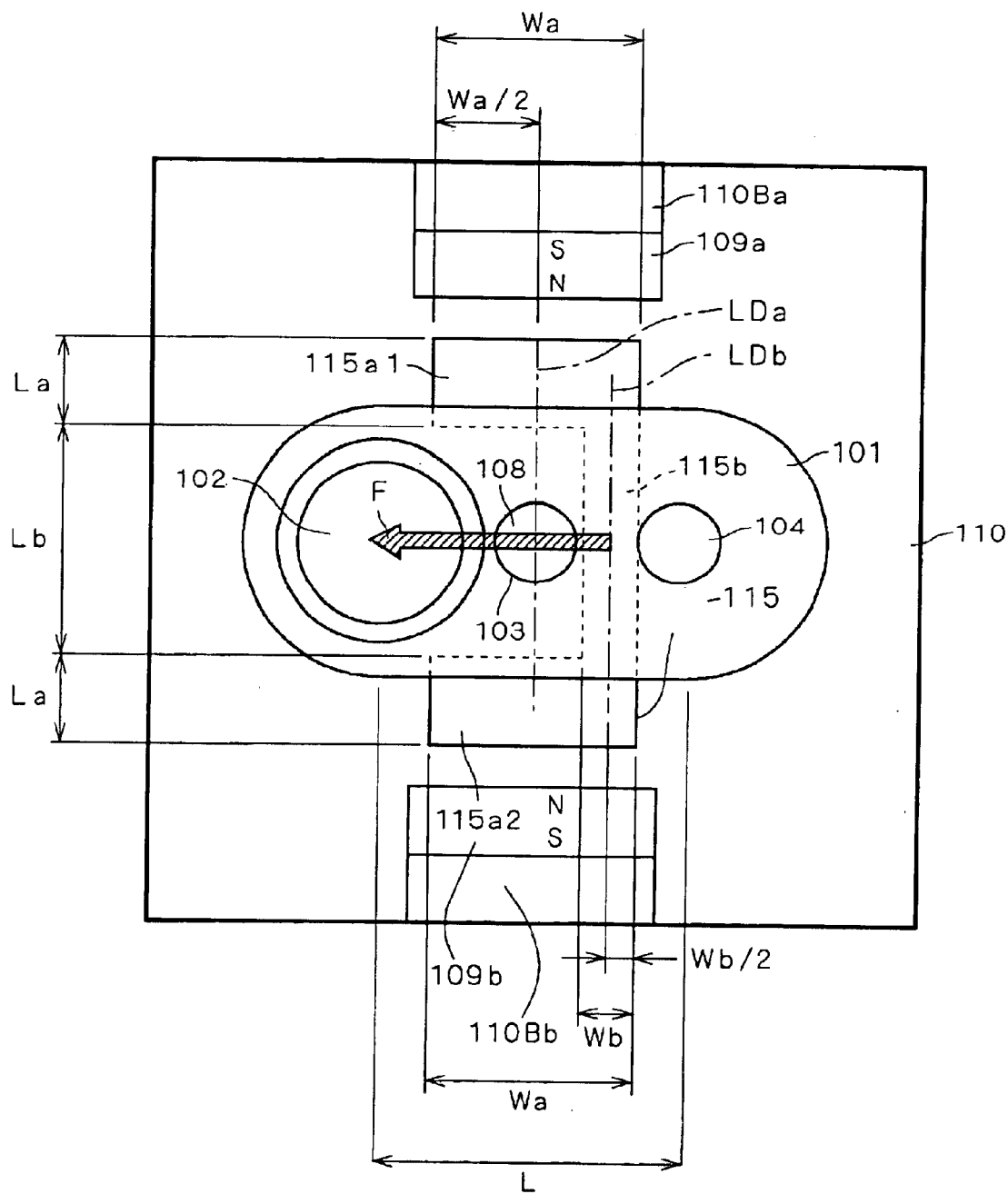
F I G . 1 1

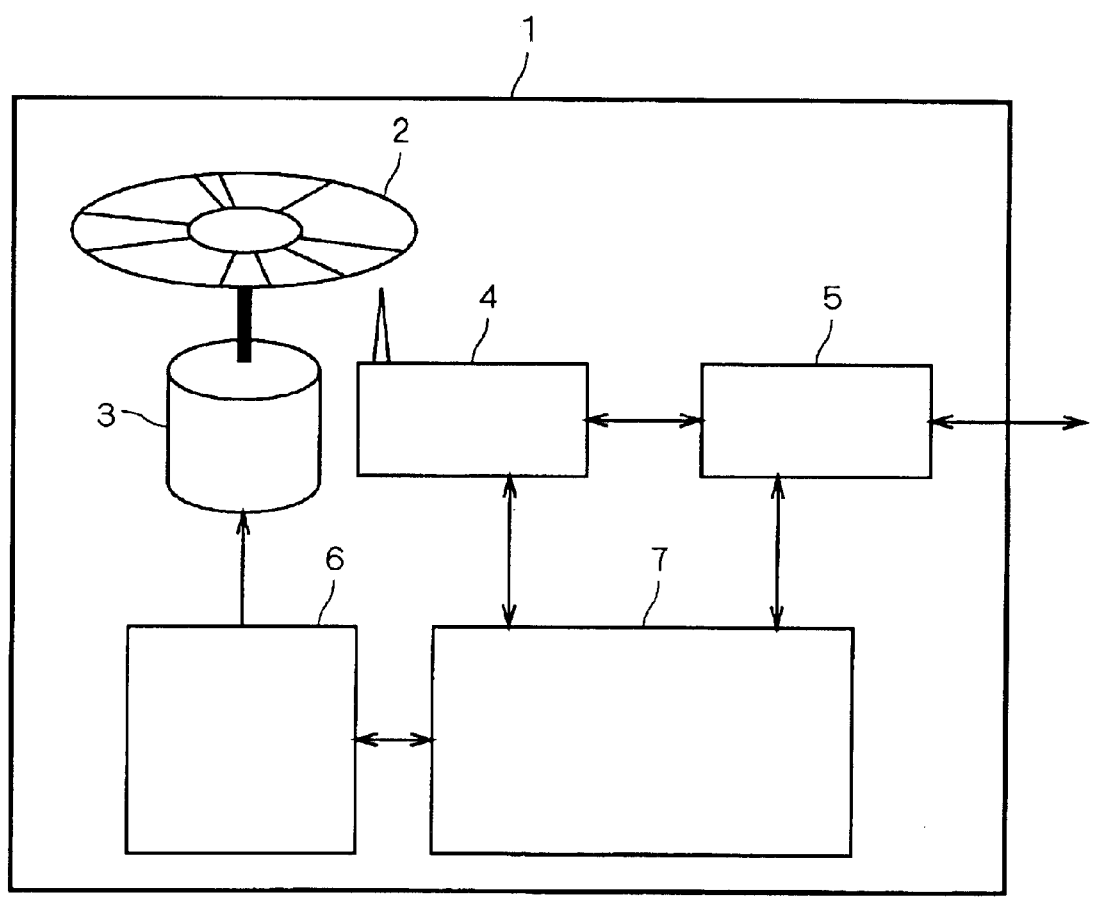
F I G . 16

OPTICAL ELEMENT DRIVING DEVICE HAVING TWO PERMANENT MAGNETS AND ONE MAGNETIC SUBSTANCE

This nonprovisional application claims priority under 35 U.S.C. § 119(a) on Patent Application No. 2002-080669 filed in Japan on Mar. 22, 2002, which is herein incorporated by reference.

BACKGROUND OF THE INVENTION

1. Field of the Invention

The present invention relates to an optical element driving device which is used as an optical head in an optical disc device for performing recording or playback of information on information recording media (optical discs) such as a DVD (Digital Versatile Disc) recorder, and more particularly to a technique for constructing a system for holding a neutral position of an optical element.

2. Description of the Background Art

One of the known systems for holding a neutral position of an optical element is disclosed in Japanese Patent Application Laid-Open No. 7-110955. FIG. 13 is a plan view showing a prior-art objective lens driving device disclosed in this gazette. FIG. 14 is a longitudinal section showing the objective lens driving device of FIG. 13, and FIG. 15 is a perspective view showing a magnetic piece used for the objective lens driving device of FIG. 13.

In FIGS. 13 to 15, reference numeral 1 denotes a lens holder, 2 denotes an objective lens, 3 denotes a tracking driving coil, 4 denotes a focusing driving coil and 5 denotes an inner yoke. Further, reference numeral 6 denotes a magnet, reference sign 6a denotes a focusing magnet portion, 6b denotes a tracking magnet portion, 6c denotes a groove, reference numeral 7 denotes a fixed axle, 8 denotes a balancer, 9 denotes an outer yoke, reference sign 9a denotes a boss portion, reference numeral 10 denotes a magnetic piece, reference signs 10a, 10b denotes end portions and 10c denotes a center portion.

In FIGS. 13 to 15, the lens holder 1 is supported rotatably about the fixed axle 7 and movably along the fixed axle 7. The objective lens 2 and the balancer 8 are disposed at end portions of the lens holder 1, and the tracking driving coil 3 and the focusing driving coil 4 are fixed to an outer peripheral surface thereof. The fixed axle 7 is fixed to the boss portions 9a in the center portion of the outer yoke 9. The magnet 6 is fixed to an inner surface of the outer yoke 9 and consists of the focusing magnet portion 6a, the tracking magnet portion 6b and the groove 6c. The focusing magnet portion 6a is magnetically polarized so that the north pole and the south pole should be aligned in the direction of the fixed axle 7, and the tracking magnet portion 6b is magnetically polarized so that the north pole and the south pole should be aligned circumferentially. The inner yoke 5 is layered on the outer yoke 9.

Further, in the peripheral edge of the lens holder 1, the magnetic piece 10 is fixed to a position opposite to a magnetic core of the focusing magnet portion 6a.

An operation of the present device will be discussed below. Specifically, by energizing the focusing driving coil 4, the objective lens 2 together with the lens holder 1 is moved in a focusing direction, i.e., in the axial direction of the fixed axle 7, for focusing control. Further, by energizing the tracking driving coil 3, the lens holder 1 is rotated about the fixed axle 7 to perform tracking control of the objective lens 2.

The prior-art objective lens driving device having the above constitution, however, has the following problems.

First, since two magnetic pieces are needed to exert the magnetic suction force for holding a neutral position of the objective lens, the cost of parts becomes higher and the number of fabrication steps increases.

Second, since two magnets for focusing control and two magnets for tracking control, total four magnets, are needed and it is necessary to magnetically polarize these magnets, the cost becomes higher.

SUMMARY OF THE INVENTION

It is an object of the present invention to provide an optical element driving device having a simple constitution and requiring low cost. It is another object of the present invention to improve efficiency of preparing a magnetic substance in the optical element driving device.

The present invention is intended for an optical element driving device. According to an aspect of the present invention, the optical element driving device includes a shaft having an axis line in parallel to an optical axis of an optical element, a holder, a focusing driving device, a tracking driving device and a magnetic substance fixed to the holder. The holder holds the optical element at one end portion thereof, has a bearing portion which is so formed as to penetrate the center portion thereof and loosely engaged in the shaft, and is supported by the shaft through the bearing portion movably in parallel to and rotatably about the shaft. The focusing driving device controls the driving of the holder in the axial direction of the shaft, and on the other hand, the tracking driving device controls the driving of the holder about the axis line. The focusing driving device and the tracking driving device are constituted of first and second permanent magnets which are opposed to each other with the shaft interposed therebetween and coils. The magnetic substance includes first and second end portions having the same shape and the same size and a connection portion connecting the first and second end portions. The width of the connection portion is narrower than that of the first and second end portions, and the first end portion is opposed to the first permanent magnet and the second end portion is opposed to the second permanent magnet.

Since two permanent magnets serving as the focusing driving device and the tracking driving device are also used as an optical element neutral position holding system and these permanent magnets and the magnetic substance unified in the holder form the above optical element neutral position holding system, it is possible to easily form the optical element neutral position holding system with a small number of parts. Therefore, the present invention can provide an optical element driving device having simpler constitution and requiring lower manufacturing cost, as compared with the prior-art device. Moreover, since the connection portion of the magnetic substance is located farther away from these permanent magnets than the end portions thereof, it is also possible to produce an effect of high degree of flexibility in determining the shape of the connection portion.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 7 and 8 are magnetic substance preparation layout plans each showing a layout of the magnetic substances in a case where the magnetic substances in the optical element driving device in accordance with the first preferred embodiment are prepared from a magnetic plate by etching or the like;

FIG. 11 is a perspective plan view showing an optical element driving device in accordance with a second preferred embodiment of the present invention;

FIG. 16 is a view schematically showing an optical disc device which has the optical element driving device in accordance with the present invention as an optical head.

DESCRIPTION OF THE PREFERRED EMBODIMENTS

The characteristic feature of the optical element driving device in accordance with the present invention lies in that a power of holding a neutral position of an objective lens is formed of two unipolar permanent magnets which are constituents of a focusing control device and a tracking control device and one magnetic substance having high preparation efficiency.

Further, in the optical element driving device of the present invention, by displacing the center portion of a connection portion of the above magnetic substance with respect to the center portion of both end portions thereof, the shape of the magnetic substance is made nonaxisymmetric. This produces a translational force for the connection portion of the magnetic substance. Then, the objective lens is disposed proximately to the shaft.

Furthermore, in the optical element driving device of the present invention, after disposing end portions of magnetic substances proximately to each other with high efficiency so as to be proximate to connection portions of other magnetic substances in a magnetic plate, these magnetic substances are prepared by etching or the like.

Hereafter, detailed discussion will be made on preferred embodiments of the present invention, referring to figures.

(The First Preferred Embodiment)

Figure 1:
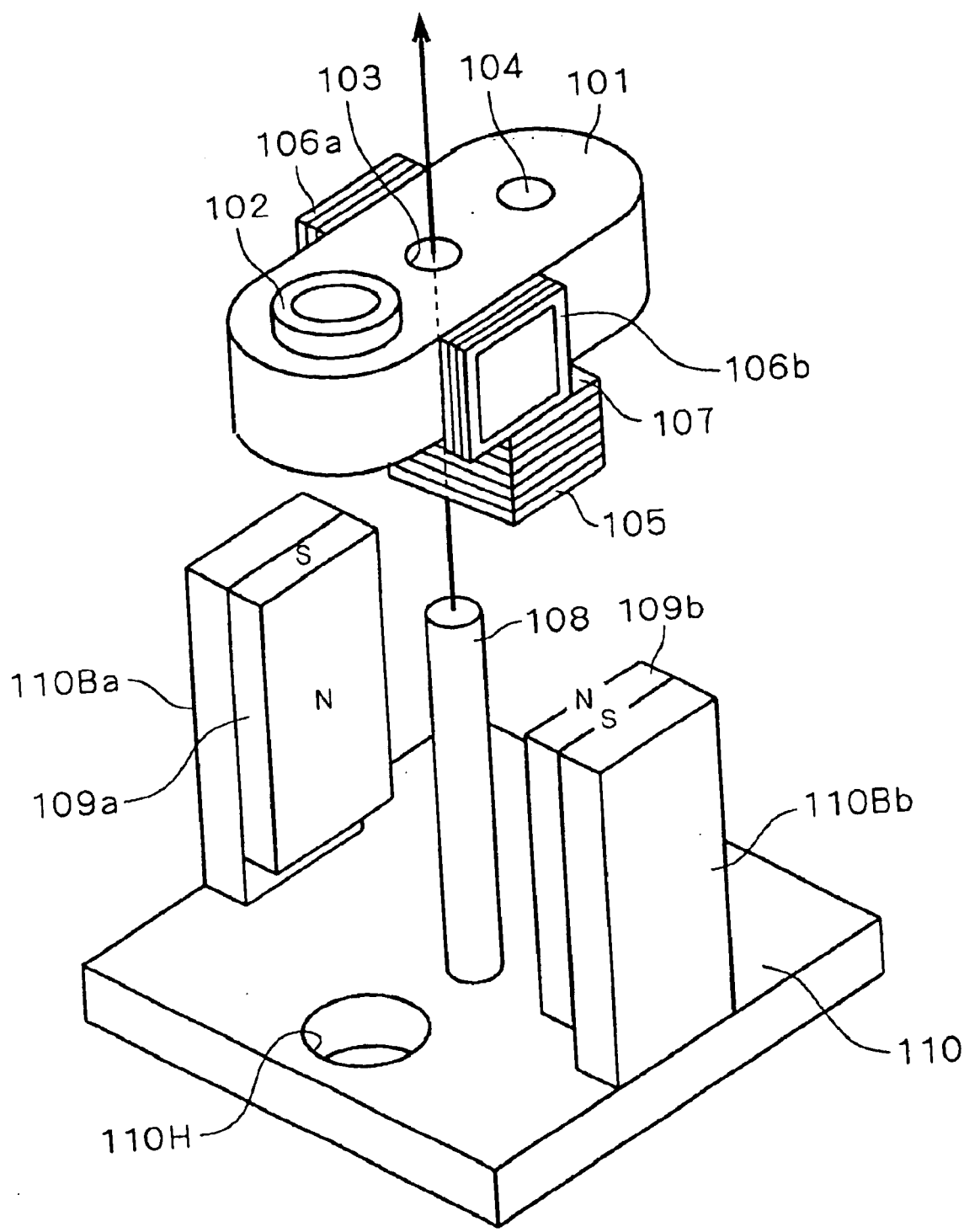
FIG. 1 is a schematic perspective view showing an optical element driving device in accordance with a first preferred embodiment of the present invention.
Figure 2:
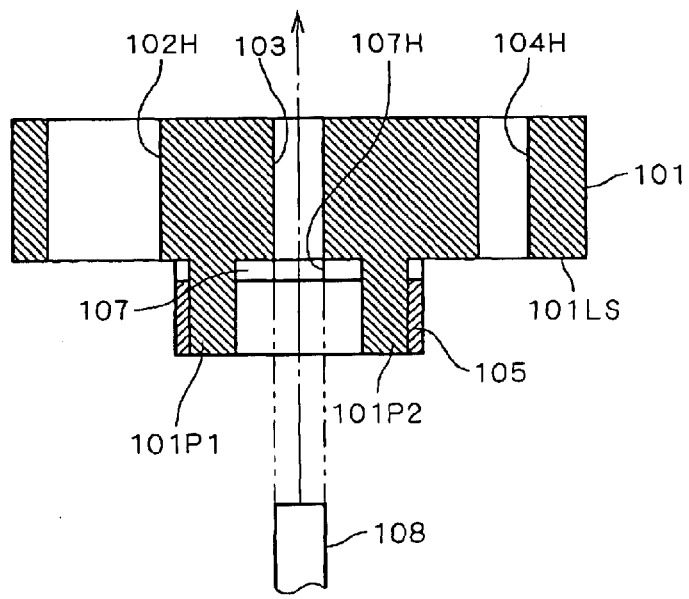
FIG. 2 is a longitudinal section schematically showing an exemplary method of fixing a magnetic substance and a focusing coil.
Figure 3:
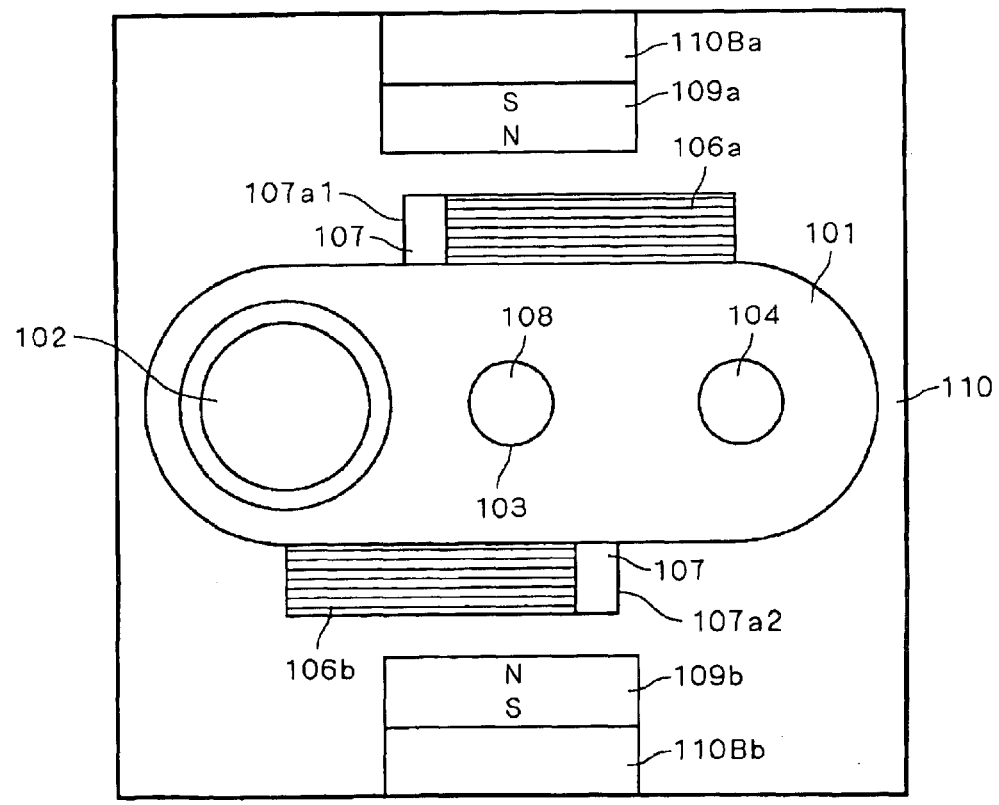
FIG. 3 is a plan view showing the optical element driving device in accordance with the first preferred embodiment of the present invention.
Figure 4:
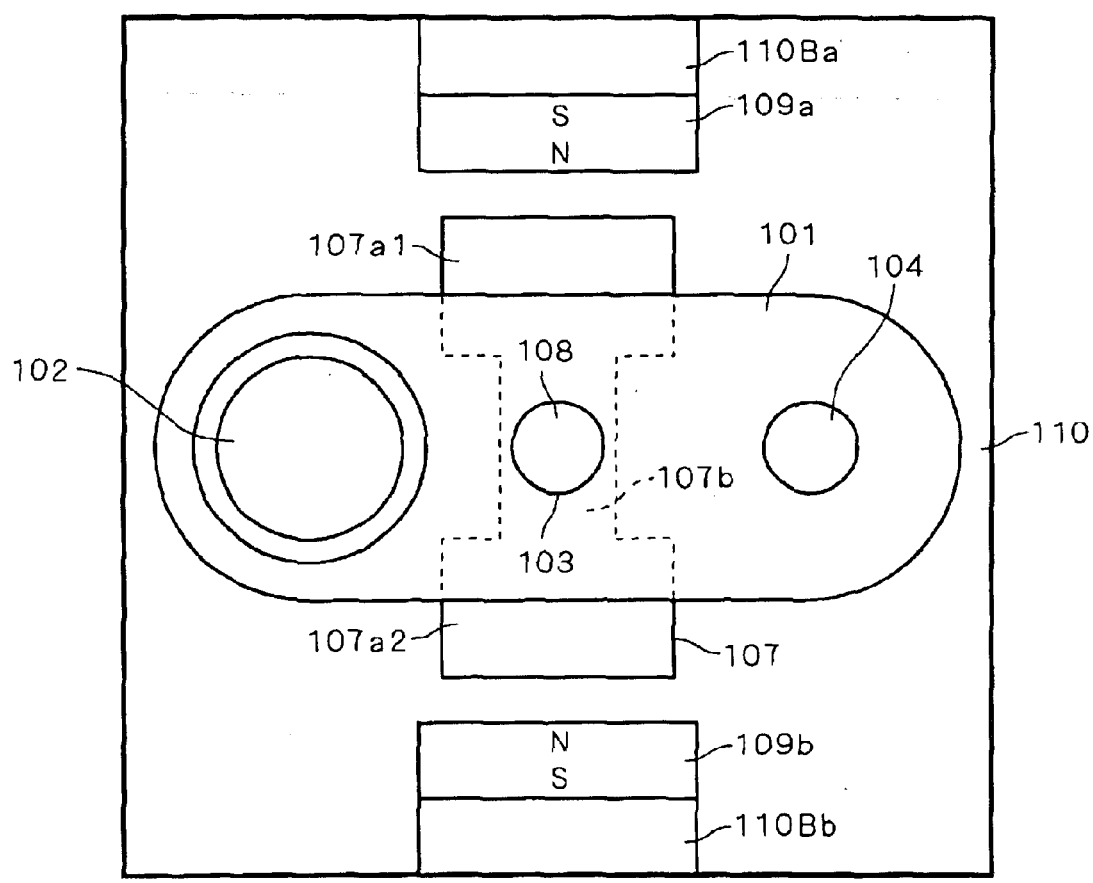
FIG. 4 is a perspective plan view clearly showing the position of the magnetic substance.
Figure 5:
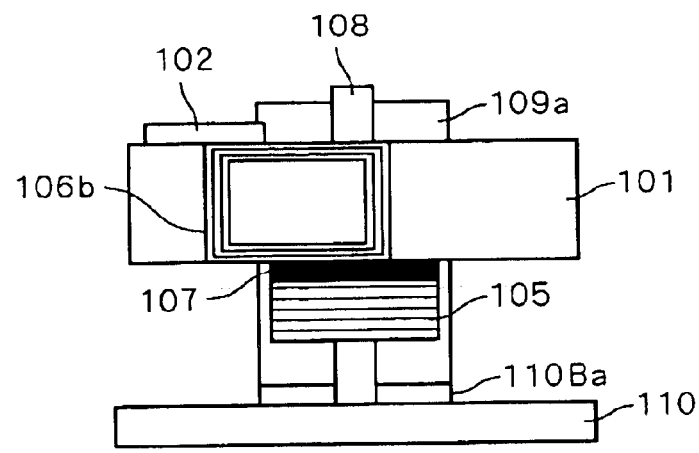
FIG. 5 is a side elevation showing the optical element driving device in accordance with the first preferred embodiment of the present invention.
Figure 6:
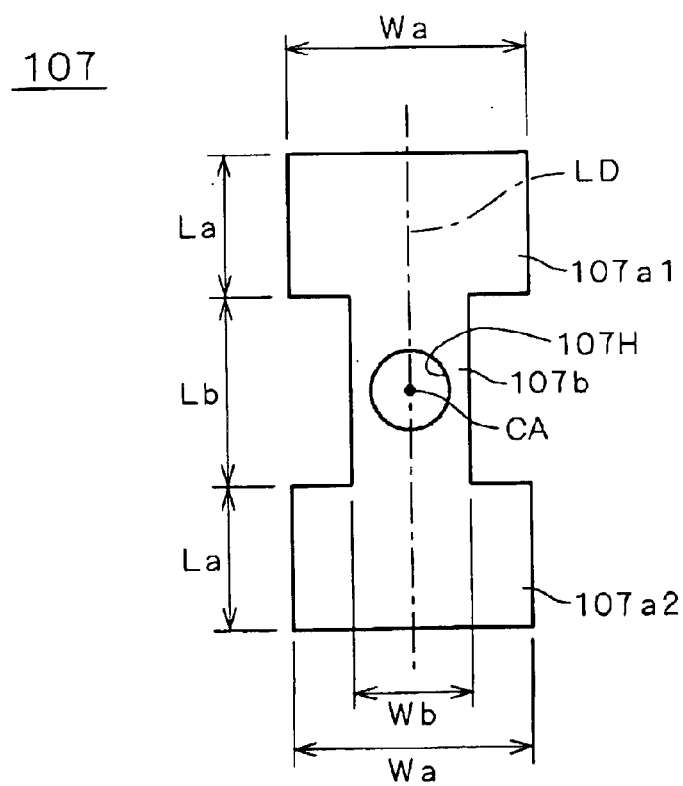
FIG. 6 is an enlarged view showing the magnetic substance of the optical element driving device in accordance with the first preferred embodiment of the present invention.

FIG. 1 is a perspective view schematically showing a constitution of an optical element driving device in accordance with the first preferred embodiment of the present invention. FIG. 2 is a longitudinal section schematically showing an exemplary method of fixing a magnetic substance and a focusing coil of FIG. 1. FIG. 3 is a plan view showing the optical element driving device of FIG. 1, and FIG. 4 is a perspective plan view clearly showing the position of the magnetic substance of FIG. 3. FIG. 5 is a side elevation showing the optical element driving device of FIG. 1. FIG. 6 is an enlarged view showing the magnetic substance of FIG. 4. FIGS. 7 and 8 are magnetic substance preparation layout plans showing a layout of the magnetic substances in a case where the magnetic substances of FIG. 6 is prepared from a magnetic plate by etching or the like.

In FIGS. 1 to 8, respective reference signs represent the following constituent elements. Specifically, reference numeral 101 denotes a lens holder (also referred to simply as a holder), 102 denotes an objective lens as an optical element, which is supported by one end portion of the lens holder 101 with its core portion inserted in a through hole 102H formed at the end portion of the lens holder 101, 103 denotes a bearing portion formed in a center portion of the lens holder 101, serving as a through hole, and 104 denotes a counterweight held by the other end portion of the lens holder 101, being inserted in a through hole 104H formed at the other end portion of the lens holder 101.

Reference numeral 105 denotes a focusing coil having a hollow center portion, reference sign 106a denotes a first tracking coil and 106b denotes a second tracking coil.

Reference numeral 107 denotes a magnetic substance, and this magnetic substance 107 and two permanent magnets discussed later constitute a neutral position holding system for the objective lens 102. Further, reference sign 107a1 denotes a first end portion (length La, width Wa) in a longer direction LD of the magnetic substance 107 and 107a2 denotes a second end portion on the opposite side in the longer direction LD of the magnetic substance 107, which has the same shape and the same size as the first end portion 107a1. Further, reference sign 107b denotes a connection portion (length Lb, width Wb) extending in the longer direction LD, for connecting the first and second end portions 107a1 and 107a2 of the magnetic substance 107 and reference sign 107H denotes a through hole formed at the center portion of the connection portion 107b and reference sign CA denotes a central axis of the through hole 107H. As shown in FIG. 6, the magnetic substance 107 has an axisymmetric shape with respect to a line in parallel to the longer direction LD going through the central axis CA.

On the other hand, reference numeral 110 denotes a base, and 108 denotes a shaft standing at the center portion of the base 110 and having an axis line in parallel to the optical axis of the objective lens 102. The shaft 108 has an axial diameter slightly smaller than the diameter of the bearing portion 103 and that of the through hole 107H, and the clearance between the shaft 108 and these portions 103 and 107H is, e.g., 5 $\mu$m to 10 $\mu$m. Further, reference sign 110Ba denotes a first board standing at one end portion of the base 110 so that its mounting portion should face the shaft 108 and 110Bb denotes a second board standing at the other end portion of the base 110 so that its mounting portion should face that of the first board 110Ba with the shaft interposed therebetween. Reference sign 109a denotes a first permanent magnet attached on the mounting portion of the first board 110Ba so that its north pole should be positioned on the side of the shaft 108, 109b denotes a second permanent magnet attached on the mounting portion of the second board 110Bb so that its north pole should be positioned on the side of the shaft 108 and 110H denotes a through hole for lights passing through the objective lens 102.

Reference numerals 111 and 112 denote magnetic plates which are materials used in preparation of the magnetic substances 107 by etching or the like.

In FIG. 4, the magnetic substance 107 is transparently represented and from the viewpoint of easy representation, the tracking coils 106a and 106b of FIG. 3 are omitted. Further, in FIG. 5, for convenience of illustration, the second permanent magnet 109b and the second board 110Bb on this side of figure are omitted.

The lens holder 101 is formed of light and highly-stiff engineering plastic or the like, and has the bearing portion 103 serving as a through hole at its center portion. At one end portion of the lens holder 101, the objective lens 102 is held, being inserted in the through hole 102H and at the other end portion of the lens holder 101, the counterweight 104 is provided, being inserted in the through hole 104H formed therein. The optical axis of the objective lens 102 and the axis of the bearing portion 103 are in parallel to each other.

The focusing coil 105 is fixed on a lower surface 101LS of the lens holder 101 so that its coil axis should be coaxial with the bearing portion 103. Moreover, in the first preferred embodiment, the magnetic substance 107 is also fixed on the lower surface 101LS of the lens holder 101, being sandwiched by the focusing coil 105, and unified in the lens holder 101. An exemplary method of fixing the magnetic substance 107 and the focusing coil 105 to the lens holder 101 is shown in the longitudinal section of FIG. 2. Specifically, two projections 101P1 and 101P2 are so provided, extending in parallel to each other in a direction perpendicular to the paper of FIG. 2, as to be opposed to each other with a spacing of substantial width of the magnetic substance 107 in a portion of the lower surface 101LS which is positioned between one end portion of the lens holder 101 (near the portion where the through hole 102H is formed) and the other end portion (near the portion where the through hole 104H is formed) and around the edge of the bearing portion 103. The magnetic substance 107 is loosely inserted between these projections 101P1 and 101P2 and the focusing coil 105 is further loosely inserted thereon. At this time, the magnetic substance 107 and the focusing coil 105 are fixed to the holder 101 by, e.g., an adhesive with the projections 101P1 and the 10P2 used as guides. The central axis CA of the through hole 107H provided in the center portion of the connection portion 107b of the magnetic substance 107 and the axis of the bearing portion 103 become coaxial. Therefore, the central axis CA become coaxial with the axis line of the shaft 108.

The first and second tracking coils 106a and 106b are fixed on side surfaces of the lens holder 101 so that their coil axes should be orthogonal to the axis of the bearing portion 103 and decentered on opposite sides with respect to the axis of the bearing portion 103.

As shown in FIG. 6, the magnetic substance 107 consists of the first end portion 107a1 and the second end portion 107a2 which have the same shape and the same size and the connection portion 107b connecting these end portions 107a1 and 107a2. The width Wb of the connection portion 107b is narrower than the width Wa of the first and second end portions 107a1 and 107a2. Moreover, the length Lb of the connection portion 107b in the longer direction LD is slightly longer than the length La of the first and second end portions 107a1 and 107a2 in the longer direction LD (less than twice the length La). Thus, the magnetic substance 107 has an axisymmetric shape with respect to the central axis of consubstantial one 107 orthogonal to the central axis CA of the through hole 107H and parallel to the longer direction LD. Additionally, the first end portion 107a1 is opposed to an N-pole surface of the first permanent magnet 109a and the second end portion 107a2 is opposed to an N-pole surface of the second permanent magnet 109b. As discussed earlier, the connection portion 107b also has the through hole 107H which is coaxial with the bearing portion 103 in fixing the magnetic substance 107 to the lens holder 101.

The shaft 108 fixedly stands at the center portion of the base 110, going through the hollow portion of the focusing coil 105, and is loosely inserted in the through hole 107H of the magnetic substance 107 and the bearing portion 103 of the lens holder 101. With this loose insertion, the lens holder 101 is supported by the shaft 108, through the bearing portion 103, movably in parallel to and rotatably about the shaft 108.

The first and second permanent magnets 109a and 109b are so attached to the first and second boards 110Ba and 110Bb by an adhesive, respectively, as to be opposed to the first and second tracking coils 106a and 106b and the focusing coil 105 with the shaft 108 interposed therebetween, and the optical element driving device of the present invention has a unipolar structure where the same poles (the north poles in the figure) of the permanent magnets face each other. Further, as discussed earlier, the first and second permanent magnets 109a and 109b are disposed proximately to the end portions 107a1 and 107a2 of the magnetic substance 107, thereby applying a magnetic suction force to the magnetic substance 107.

In the optical element driving device of the present invention, two permanent magnets 109a and 109b and the focusing coil 105 constitute a focusing driving device, and two permanent magnets 109a and 109b and two tracking coils 106a and 106b constitute a tracking driving device.

Next, an operation of the present device will be discussed. First, a focal shift of condensing spot produced by the objective lens 102 on an optical disc (not shown) or a track shift of the condensing spot with respect to a predetermined track is detected. Then, by carrying a signal corresponding to the focal shift to the focusing coil 105, the lens holder 101 is moved in the direction of optical axis of the objective lens 102 for focusing control. Similarly, by carrying a signal corresponding to the track shift to the tracking coils 106a and 106b, the lens holder 101 is rotated about the shaft 108 for tracking control of the objective lens 102.

Thus, when the lens holder 101 is translated vertically in the optical axis direction or rotated about the shaft 108, the first and second end portions 107a1 and 107a2 of the magnetic substance 107 are given the respective magnetic suction forces exerted from the first and second permanent magnets 109a and 109b. In other words, the permanent magnets 109a and 109b produce forces to restore the lens holder 101 to a predetermined state. In this case, it is possible to set the magnitude of the magnetic suction force to a desired value, depending on the material and thickness of the magnetic substance, the distance between the magnetic substance and the permanent magnets opposed thereto or the like. Since the connection portion 107b is located father away from these permanent magnets 109a and 109b than the end portions 107a1 and 107a2, the restoring force applied to the connection portion 107b is relatively small.

Therefore, it is possible to determine the shape of the connection portion 107b relatively freely. In other words, the shape of the connection portion 107b is not limited to a shape having a rectangular cross section as shown in FIG. 4, but can be freely designed.

Next, efficiency in preparation of the magnetic substance 107 from a piece of magnetic plate will be discussed, referring to FIG. 7 and FIG. 8 (comparison with FIG. 7).

In the first preferred embodiment, since the width Wb of the connection portion 107b is narrower than the width Wa of the end portions 107a1 and 107a2, by actively utilizing the width difference, the magnetic substance 107 can be prepared from a piece of magnetic plate by etching or the like. Specifically, portions to become the magnetic substances 107 are combined and arranged in a piece of magnetic plate 111 so that portions to become the connection portions 107b of magnetic substances 107 and portions to become either of the end portions 107a1 and 107a2 of respective adjacent magnetic substances 107 may be arranged as shown in FIG. 7 (part of the portions to become either of the end portions 107a1 and 107a2 may be positioned in respective dents formed by the portions to become the connection portions 107b). With this setting, it is possible to efficiently increase the number of magnetic substances 107 taken out of a magnetic plate 111 of the same shape. Further, though it seems in FIG. 7 that many portions are not used as the magnetic substance 107 since FIG. 7 shows a case of using a relatively small magnetic plate 111 in order to clear the arrangement, actually, portions not used as the magnetic substance 107 are relatively small because the spaces between the magnetic substances 107 are small.

In contrast, when the portions to become the magnetic substances 107 are aligned in a magnetic plate 112 as shown in FIG. 8, the number of magnetic substances 107 taken out of the magnetic plate 112 is equal to that in the case where magnetic substances in each of which the width of the connection portion is equal to that of the end portions are taken out of a piece of magnetic plate, and there are many spaces between the portions to become the magnetic substances 107 in the magnetic plate 112 and the portions not used as the magnetic substances 107 are relatively large. Therefore, the efficiency in terms of area ratio of the area taken out of a piece of magnetic plate as the magnetic substance to that of the magnetic plate is lower in the case of FIG. 8. Thus, comparing the cases of FIGS. 7 and 8 clarifies the advantage produced by the structure of the first preferred embodiment where the width Wb of the connection portion 107b is narrower than that of the end portions 107a1 and 107a2 and the length Lb of the connection portion 107b is longer than that of the end portions 107a1 and 107a2.

(Variation of the First Preferred Embodiment)

The characteristic feature of the present variation lies in that the length of the connection portion of the magnetic substance in accordance with the first preferred embodiment is set twice the length of the end portions or larger. Hereafter, the present variation will be discussed, referring to figures.

Figure 9:
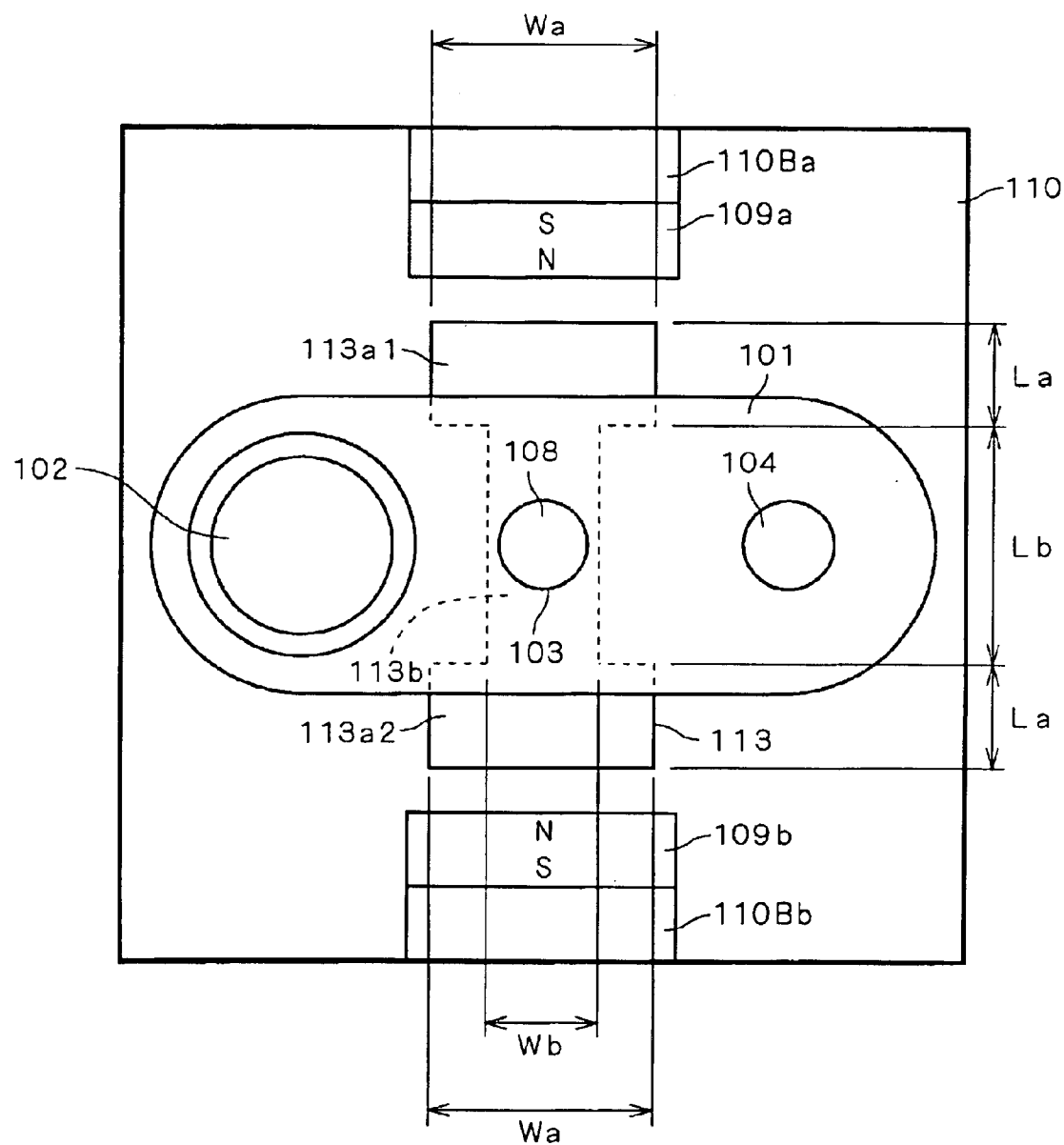
FIG. 9 is a perspective plan view showing an optical element driving device in accordance with a variation of the first preferred embodiment.
Figure 10:
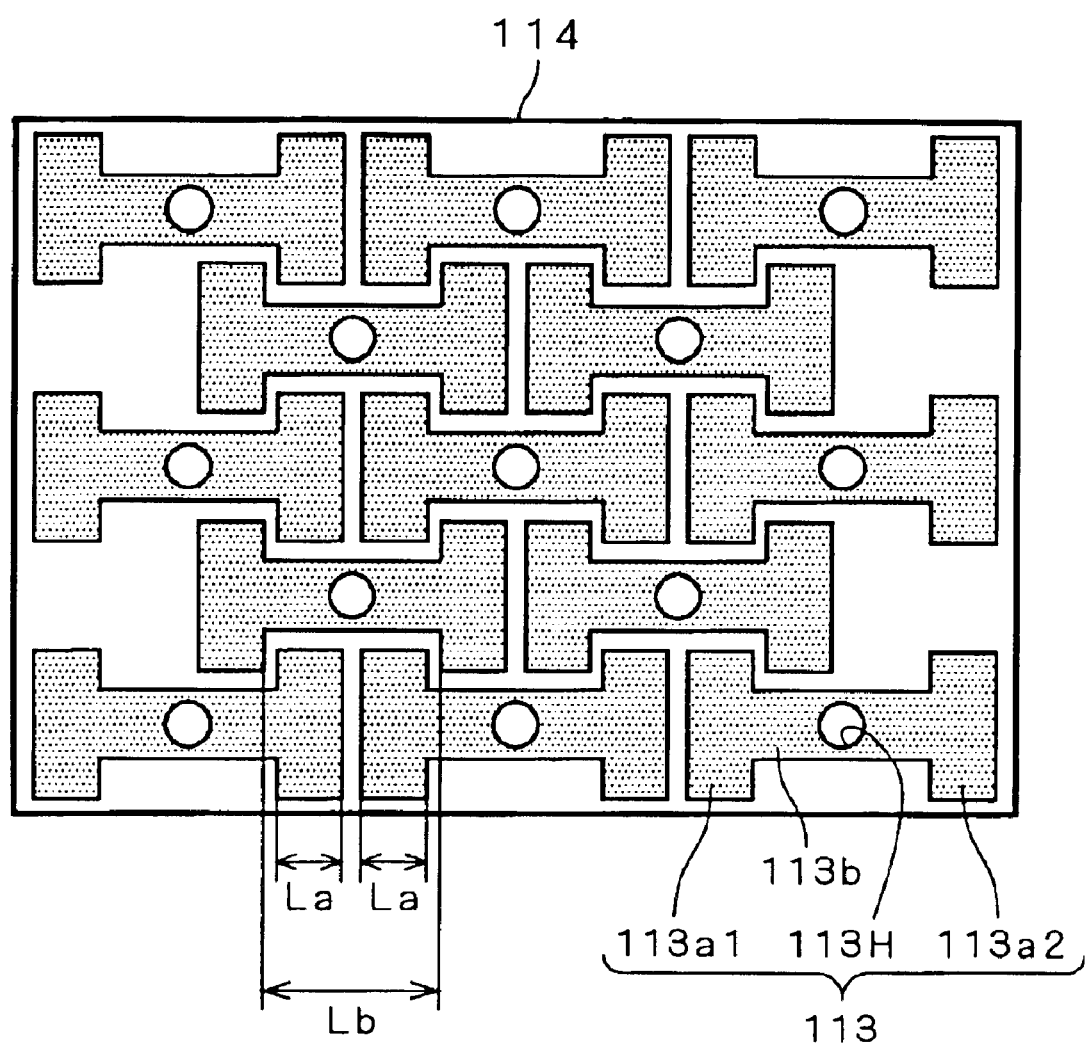
FIG. 10 is a magnetic substance preparation layout plan showing a layout of magnetic substances.

FIG. 9 is a perspective plan view showing an optical element driving device in accordance with the present variation, and FIG. 10 is a magnetic substance preparation layout plan showing a layout of the magnetic substances of FIG. 9 when taken out of a piece of magnetic plate. In FIG. 9, constituent elements having the same functions as those in the first preferred embodiment are represented by the same reference signs and description thereof will be omitted.

In FIGS. 9 and 10, reference numeral 113 denotes a magnetic substance, reference signs 113a1 and 113a2 denote first and second end portions of the magnetic substance 113, 113b denotes a connection portion of the magnetic substance 113 and 113H denotes a through hole of the connection portion 113b. Further, reference numeral 114 denotes a magnetic plate used as a material in preparation of the magnetic substance by etching or the like.

As shown in FIG. 9, the magnetic substance 113 has a structure where the length La of the end portions 113a1 and 113a2 is half the length Lb of the connection portion 113b or shorter (Lb≧2La). Other constituent elements are the same as those in FIGS. 1 to 5.

Next, an operation will be discussed, and since the basic operation is the same as that in the first preferred embodiment, common part of the operation will be omitted. Since the end portions 113a1 and 113a2 of the magnetic substance 113 are disposed proximately to the corresponding permanent magnets 109a and 109b, the magnetic suction forces from the permanent magnets 109a and 109b are exerted on the corresponding end portions 113a1 and 113a2, and the permanent magnets 109a and 109b thereby work to restore the lens holder 101 to the predetermined state. It is possible to set the magnitude of the magnetic suction force to a desired value, depending on the material and thickness of the magnetic substance 113, the distance between the permanent magnets 109a and 109b and the end portions 113a1 and 113a2 or the like. Since the connection portion 113b is located father away from these permanent magnets 109a and 109b than the end portions 113a1 and 113a2, the restoring force applied to the connection portion 113b is relatively small. Therefore, it is possible to set the length of the connection portion 113b to be twice the length of the end portions 113a1 and 113a2 or longer.

The characteristic feature of the present variation lies in that the efficiency of taking the magnetic substances out of a piece of magnetic plate can be improved as compared with that of the first preferred embodiment. This allows further reduction in manufacturing cost. Specifically, by utilizing the relation Lb≧2La as shown in FIG. 10, it is possible to proximately dispose two portions to become the end portions 113a1 and 113a2 of other magnetic substances 113 in a dent formed by the portion to become the connection portion 113b of one magnetic substance 113. With this arrangement, it becomes possible to further improve the efficiency in the number of magnetic substances taken out of the magnetic plate, as compared with the case of FIG. 7. In particular, it can be understood that the efficiency in a peripheral portion of the magnetic plate 114 is markedly improved.

(The Second Preferred Embodiment)

Figure 12:
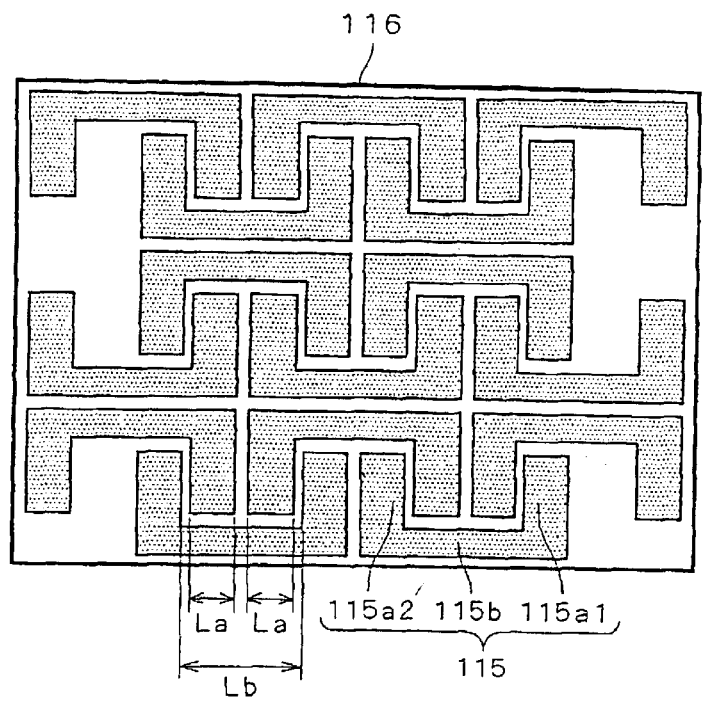
FIG. 12 is a magnetic substance preparation layout plan showing a layout of magnetic substances.
Figure 13:
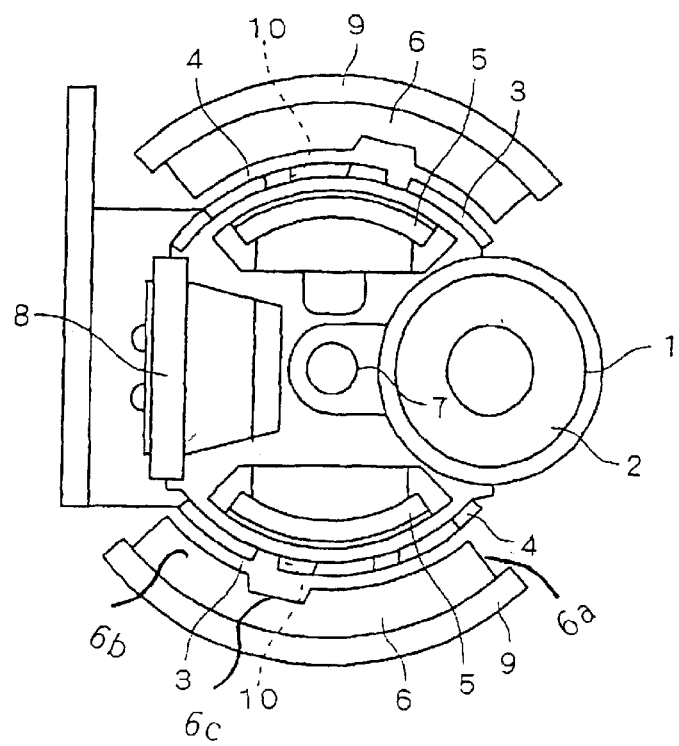
FIG. 13 is a plan view showing an objective lens driving device in the prior art.
Figure 14:
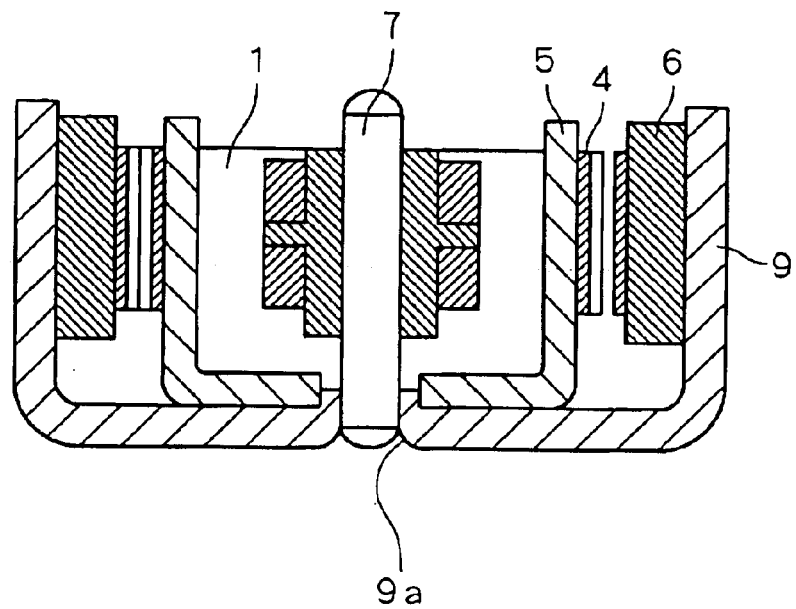
FIG. 14 is a longitudinal section showing the objective lens driving device in the prior art.
Figure 15:
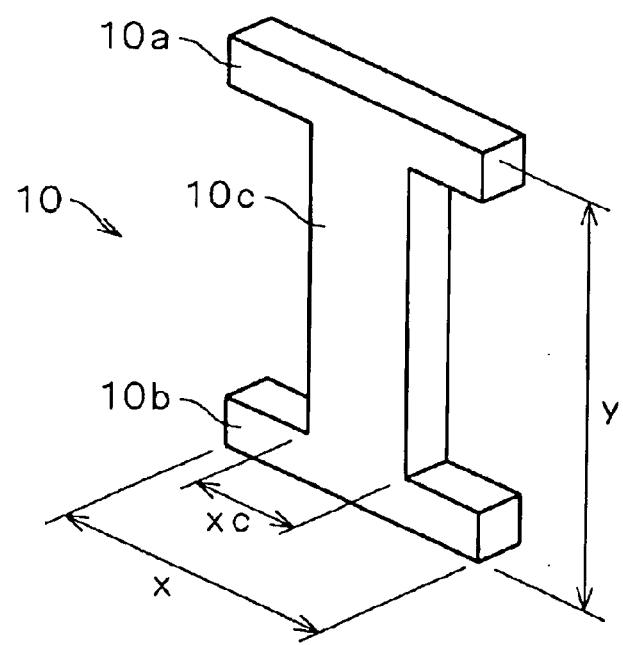
FIG. 15 is a perspective view showing a magnetic piece used for the prior-art objective lens driving device.

FIG. 11 is a perspective plan view showing an optical element driving device in accordance with the second preferred embodiment of the present invention, and FIG. 12 is a magnetic substance preparation layout plan showing a layout of the magnetic substances of FIG. 11. In FIG. 11, constituent elements having the same functions as those in the first preferred embodiment and the variation are represented by the same reference signs and description thereof will be omitted.

In FIGS. 11 and 12, reference numeral 115 denotes a magnetic substance, reference signs 115a1 and 115a2 denote first and second end portions of the magnetic substance 115, 115b denotes a connection portion of the magnetic substance 115, reference sign LDa represents a centerline in the direction of width of the end portions 115a1 and 115a2 and LDb represents a centerline in the direction of width of the connection portion 115b. On the other hand, reference numeral 116 denotes a magnetic plate used as a material in preparation of the magnetic substance by etching or the like.

As shown in FIG. 11, the magnetic substance 115 has a nonaxisymmetric shape with C-shaped cross section, and the centerline LDa of the end portions 115a1 and 115a2 in the direction of width and the centerline LDb of the connection portion 115b in the direction of width are positioned differently, being apart from each other. Moreover, the connection portion 115b is positioned near the side opposite to the disposition of the objective lens 102 with respect to the centerline LDa. Other constituent elements are the same as those in FIGS. 1 to 5.

Next, an operation will be discussed, and since the basic operation is the same as that in the first preferred embodiment and the variation, common part of the operation will be omitted. Since the end portions 115a1 and 115a2 of the magnetic substance 115 are disposed proximately to the corresponding permanent magnets 109a and 109b, the magnetic suction forces from the permanent magnets 109a and 109b are exerted on the corresponding end portions 115a1 and 115a2, and the permanent magnets 109a and 109b thereby work to restore the lens holder 101 to the predetermined disposition (the neutral position of the objective lens 102). It is possible to set the magnitude of the magnetic suction force depending on the material and thickness of the magnetic substance 115, the distance between the permanent magnets and the magnetic substance or the like. At this time, since the centerline LDb of the connection portion 115b is positioned close to the side of the counterweight 104, the magnetic suction forces exerted from the permanent magnets 109a and 109b become unbalanced and consequently a translational force F shown in FIG. 11 is exerted on the magnetic substance 115. It is also possible to control the magnitude of the translational force F depending on the width and length, the degree of shift or the like of the connection portion 115b, and an appropriate magnetic suction force to be actually exerted is relatively small (almost equal to the weight of the movable portion including the lens holder 101). The translational force F has a function of eliminating backlash between the bearing portion 103 and the shaft 108, thereby suppressing a nonlinear operation of the optical element driving device. Further, the magnetic substance 115 has no necessity of providing a through hole, such as the through holes 107H and 113H provided in the connection portions 107b and 113b of the magnetic substances 107 and 113 of the first preferred embodiment and the variation, and has an advantageous shape in terms of stiffness.

Furthermore, in the second preferred embodiment, since the magnetic substance 115 is disposed close to the side of the counterweight 104 outside the shaft 108, it is possible to provide the through hole 102H serving as the holding system of the objective lens 102 closer to the side of the shaft 108 than those in the first preferred embodiment and the variation and moreover possible to dispose the counterweight 104 closer to the side of the shaft 108, and therefore the length L of the lens holder 101 in the longer direction can be made shorter than that in the first preferred embodiment and the variation. In other words, the second preferred embodiment can promote downsizing of the lens holder 101.

Next, discussion will be made on arrangement of portions to become the magnetic substances in taking the magnetic substances 115 out of a piece of magnetic plate. Specifically, also in the second preferred embodiment, since the length Lb of the connection portion 115b is twice the length La of the end portions 115a1 and 115a2 or longer, it is possible to proximately dispose two portions to become the end portions 115a1 and 115a2 of other magnetic substances 115 in a dent formed by the portion to become the connection portion 115b of one magnetic substance 115 in the magnetic plate 116 as shown in FIG. 12, and it becomes possible to further improve the efficiency in the number of magnetic substances taken out of the magnetic plate, as compared with the case of FIG. 10. Since it is not necessary to provide any through hole in the connection portion 115b, it can be understood that the degree of flexibility in design is further improved.

(Other Variations)

(1) The number of tracking coils is not limited to two, but more than two tracking coils may be used. Further, the disposition of the tracking coils is not limited to the side surface of the lens holder 101, but the tracking coils may be disposed on other portions (e.g., on the lower surface) of the lens holder 101.

(2) The focusing coil 105 is not necessarily disposed on the lower surface of the lens holder 101 but may be disposed on other portions (e.g., on the side surface) of the lens holder 101.

(3) The magnetic substance 107 is not necessarily disposed on the lower surface of the lens holder 101, being sandwiched, but may be disposed on other portions of the lens holder 101. In short, the magnetic substance 107 has only to be fixed on the lens holder 101 so that the first end portion 107a1 of the magnetic substance 107 can face the first permanent magnet 109a and the second end portion 107a2 can face the second permanent magnet 109b.

(4) The permanent magnets 109a and 109b are not necessarily disposed outside of an outer frame of the lens holder 101, but there may be a case, for example, where the lens holder is formed in a cylindrical shape having the same size as the base 110 and the permanent magnets are disposed inside the lens holder.

(Notes)

By using the optical element driving device which has a simple constitution and requires low cost discussed in the fist preferred embodiment, the variation, the second preferred embodiment and the like as an optical head, a downsized and low-cost optical disc device can be achieved.

FIG. 16 is a block diagram schematically showing a constitution of an optical disc device which has the above-discussed optical element driving device as an optical head device. In FIG. 16, an optical disc device 1 is constituted of an optical disc 2, a motor 3 for rotating the optical disc 2, an optical head device 4 for reading information out from the optical disc 2, a signal processing device 5 for processing a signal read out by the optical head device 4, a motor driving device 6 for controlling rotation of the motor 3, an optical head control device 7 for performing the focusing control, the tracking control and the like of the optical head device 4, and the like.

While the invention has been shown and described in detail, the foregoing description is in all aspects illustrative and not restrictive. It is therefore understood that numerous modifications and variations can be devised without departing from the scope of the invention.

What is claimed is:

1. An optical element driving device comprising:
   a shaft having an axis line in parallel to an optical axis of an optical element;
   a holder holding said optical element at one end position thereof, including a bearing portion which is so formed as to penetrate the center portion thereof and loosely engaged in said shaft, and being supported by said shaft through said bearing portion movably in parallel to and rotatably about said shaft;

a focusing driving device configured to control the driving of said holder in the axial direction of said shaft;

a tracking driving device configured to control the driving of said holder about said axis line; and a magnetic substance fixed to said holder, wherein said focusing driving device and said tracking driving device are constituted of first and second permanent magnets which are opposed to each other with said shaft interposed therebetween and coils, said magnetic substance comprises first and second end portions having the same shape and the same size and a connection portion connecting said first and second end portions to form an I-shape, the width of said connection portion is narrower than the width of said first and second end portions, said first end portion is opposed to said first permanent magnet, and said second end portion is opposed to said second permanent magnet.

2. An optical disc device comprising the optical element driving device as defined in claim 1 as an optical head.

3. An optical element driving device comprising:

a shaft having an axis line in parallel to an optical axis of an optical element;

a holder holding said optical element at one end position thereof, including a bearing portion which is so formed as to penetrate the center portion thereof and loosely engaged in said shaft, and being supported by said shaft through said bearing portion movably in parallel to and rotatably about said shaft;

a focusing driving device configured to control the driving of said holder in the axial direction of said shaft;

a tracking driving device configured to control the driving of said holder about said axis line; and a magnetic substance fixed to said holder, wherein said focusing driving device and said tracking driving device are constituted of first and second permanent magnets which are opposed to each other with said shaft interposed therebetween and coils, said magnetic substance comprises first and second end portions having the same shape and the same size and a connection portion connecting said first and second end portions, the width of said connection portion is narrower than the width of said first and second end portions, said first end portion is opposed to said first permanent magnet, and said second end portion is opposed to said second permanent magnet;

wherein the length of said connection portion is longer than the length of said first and second end portions.

4. An optical element driving device comprising:

a shaft having an axis line in parallel to an optical axis of an optical element;

a holder holding said optical element at one end position thereof, including a bearing portion which is so formed as to penetrate the center portion thereof and loosely engaged in said shaft, and being supported by said shaft through said bearing portion movably in parallel to and rotatably about said shaft;

a focusing driving device configured to control the driving of said holder in the axial direction of said shaft;

a tracking driving device configured to control the driving of said holder about said axis line; and a magnetic substance fixed to said holder, wherein said focusing driving device and said tracking driving device are constituted of first and second permanent magnets which are opposed to each other with said shaft interposed therebetween and coils, said magnetic substance comprises first and second end portions having the same shape and the same size and a connection portion connecting said first and second end portions, the width of said connection portion is narrower than the width of said first and second end portions, said first end portion is opposed to said first permanent magnet, and said second end portion is opposed to said second permanent magnet;

wherein said magnetic substance includes a nonaxisymmetric shape with respect to a centerline position of said connection portion in the width direction with said centerline position of said connection portion in said width direction being different from a centerline position of said first and second end portions in said width direction.

5. The optical element driving device according to claim 4, wherein said connection portion is positioned opposite to a holding position of said optical element with respect to said shaft.

6. An optical element driving device comprising:

a shaft having an axis line in parallel to an optical axis of an optical element;

a holder holding said optical element at one end position thereof, including a bearing portion which is so formed as to penetrate the center portion thereof and loosely engaged in said shaft, and being supported by said shaft through said bearing portion movably in parallel to and rotatably about said shaft;

a focusing driving device configured to control the driving of said holder in the axial direction of said shaft;

a tracking driving device configured to control the driving of said holder about said axis line; and a magnetic substance fixed to said holder, wherein said focusing driving device and said tracking driving device are constituted of first and second permanent magnets which are opposed to each other with said shaft interposed therebetween and coils, said magnetic substance comprises first and second end portions having the same shape and the same size and a connection portion connecting said first and second end portions, the width of said connection portion is narrower than the width of said first and second end portions, said first end portion is opposed to said first permanent magnet, and said second end portion is opposed to said second permanent magnet;

wherein the length of said connection portion is longer than the sum of the length of said first end portion and the length of said second end portion.

7. An optical element driving device comprising:

a shaft having an axis line in parallel to an optical axis of an optical element;

holder means holding said optical element at one end position thereof, including a bearing portion which is so formed as to penetrate the center portion thereof and loosely engaged in said shaft, and being supported by said shaft through said bearing portion movably in parallel to and rotatably about said shaft;

focusing driving means for controlling the driving of said holder means in the axial direction of said shaft;

tracking driving means for controlling the driving of said holder means about said axis line; and a magnetic substance fixed to said holder means, wherein said focusing driving means and said tracking driving means are constituted of first and second permanent magnets which are opposed to each other with said shaft interposed therebetween and coils, said magnetic substance comprises first and second end portions having the same shape and the same size and a connection portion for connecting said first and second end portions to form an I-shape, the width of said connection portion is narrower than the width of said first and second end portions, said first end portion is opposed to said first permanent magnet, and said second end portion is opposed to said second permanent magnet.

* * * * *